United States Patent
Svay et al.

(10) Patent No.: US 9,651,693 B2
(45) Date of Patent: May 16, 2017

(54) TARGET-ORIENTED 4D BINNING IN COMMON REFLECTION POINT

(71) Applicant: CGG SERVICES SA, Massy (FR)

(72) Inventors: Julie Svay, Guyancourt (FR); Nicolas Bousquie, Longpont sur Orge (FR); Anna Sedova, Rochefort-en-Yvelines (FR)

(73) Assignee: CGG SERVICES SAS, Massy (FR)

( * ) Notice: Subject to any disclaimer, the term of this patent is extended or adjusted under 35 U.S.C. 154(b) by 722 days.

(21) Appl. No.: 14/107,444

(22) Filed: Dec. 16, 2013

(65) Prior Publication Data

US 2014/0172307 A1 Jun. 19, 2014

Related U.S. Application Data

(60) Provisional application No. 61/738,049, filed on Dec. 17, 2012.

(51) Int. Cl.
*G01V 1/00* (2006.01)
*G01V 1/28* (2006.01)
*G01V 1/30* (2006.01)

(52) U.S. Cl.
CPC .............. *G01V 1/28* (2013.01); *G01V 1/308* (2013.01)

(58) Field of Classification Search
CPC .......... G01V 1/308; G01V 1/28; G01V 1/366; G01V 2210/51; G01V 2210/612; G01V 2210/57
USPC ........................ 702/2, 14, 16; 367/38, 57, 73
See application file for complete search history.

(56) References Cited

U.S. PATENT DOCUMENTS

| | | | |
|---|---|---|---|
| 3,531,763 A | 9/1970 | Mayne et al. |
| 4,802,147 A | 1/1989 | Moeckel |
| 4,894,809 A | 1/1990 | Moeckel |
| 4,953,142 A | 8/1990 | Rimmer |
| 4,964,103 A | 10/1990 | Johnson |
| 6,442,490 B1 | 8/2002 | Li et al. |
| 7,477,992 B2 | 1/2009 | Deffenbaugh et al. |
| 7,768,872 B2 | 8/2010 | Kappius et al. |

(Continued)

FOREIGN PATENT DOCUMENTS

| CN | 102736109 A | 10/2012 |
|---|---|---|
| GB | 1377812 | 12/1974 |
| GB | 2420408 A | 5/2006 |

OTHER PUBLICATIONS

S. Cheraghi et al., "3D Imaging Challenges in Steeply Dipping Mining Structures: New Lights on Acquisition Geometry and Processing from the Brunswick No. 6 Seismic Data, Canada", GEOPHYSICS, Sep.-Oct. 2012, pp. WC109-WC122, vol. 77, No. 5.

(Continued)

*Primary Examiner* — An Do
(74) *Attorney, Agent, or Firm* — Patent Portfolio Builders PLLC

(57) ABSTRACT

Methods and systems for target oriented 4D binning of seismic data are presented. A target depth horizon is selected in the vicinity of where 4D changes are expected. Respectively for each data vintage, relationships between the seismic traces and reflection bins, associated with the depth surface, are established and the seismic traces are divided into common reflection angle subsets. The best matching traces from both vintages are selected for each reflection bin and output for further processing.

20 Claims, 11 Drawing Sheets

(56) References Cited

U.S. PATENT DOCUMENTS

| | | | |
|---|---|---|---|
| 8,339,898 B2* | 12/2012 | Smith | G01V 1/28 367/38 |
| 2009/0290449 A1 | 11/2009 | Smith et al. | |
| 2010/0254220 A1 | 10/2010 | Tulett et al. | |

OTHER PUBLICATIONS

C. Frasier et al., "Analysis of Conventional and Converted Mode Reflections at Putah Sink, California Using Three-Component Data", GEOPHYSICS, Jun. 1990, pp. 646-659, vol. 55, No. 6.

X. Li et al., "Azimuth Preserved Trace Binning of 4D Seismic Data for Improved Repeatability", EAGE 65th Conference & Exhibition—Stavanger, Norway, Jun. 2-5, 2003, pp. 1-4.

X. Li et al., "Oseberg 4D Re-Processing—A Case History of Seismic Repeatability Analysis", 2004 SEG Annual Meeting, Oct. 10-15, 2004, Denver, Colorado, Society of Exploration Geophysicists.

M. Vyas et al, "Methods for Computing Angle Gathers Using RTM", 73rd EAGE Conference & Exhibition incorporating SPE Europec 2011, Vienna, Austria, May 23-26, 2011, F020.

M. Vyas et al, "Source Direction Angle Gathers", 73rd EAGE Conference & Exhibition incorporating SPE EUROPEC 2011, Vienna, Austria, May 23-26, 2011, G002.

\* cited by examiner

TARGET-ORIENTED 4D BINNING IN COMMON REFLECTION POINT

RELATED APPLICATION

The present application is related to, and claims priority from U.S. Provisional Patent Application No. 61/738,049, filed Dec. 17, 2012, entitled "TARGET-ORIENTED 4D BINNING IN COMMON REFLECTION POINTS," to Julie SVAY, Nicolas BOUSQUIE and Anna SEDOVA, the disclosure of which is incorporated herein by reference.

TECHNICAL FIELD

Embodiments of the subject matter disclosed herein generally relate to methods and systems for seismic data processing and, more particularly, to mechanisms and techniques to preserve specular reflections on a depth target and enhance a 4D target signature.

BACKGROUND

Seismic data acquisition and processing techniques are used to generate a profile (image) of a geophysical structure (an horizon) of the strata underlying the land surface or seafloor (the earth subsurface). Among other things, seismic data acquisition involves the generation of acoustic waves and the collection of reflected/refracted versions of those acoustic waves to generate the image. This image does not necessarily provide an accurate location for oil and gas reservoirs, but it may suggest, to those trained in the field, the presence or absence of oil and/or gas reservoirs. Thus, providing an improved image of the subsurface in a shorter period of time is an ongoing process in the field of seismic surveying.

A somewhat more recent development in seismic acquisition is the use of so-called four-dimensional (4D) seismic surveying. 4D seismic surveying refers to the technique of taking one seismic survey of a particular geographical area at a first time (i.e., the baseline survey) and another seismic survey of the same geographical area at a later time (i.e., the monitor survey). The baseline survey and the monitor survey can then be compared for various purposes, e.g., to observe changes in the hydrocarbon deposits in a geographical area which has an active well operating therein. Different seismic surveys performed at different times for the same geographical area are also sometimes referred to as different "vintages". In order for the comparison to be meaningful it is, therefore, important that the surveys be performed in a manner which is highly repeatable, i.e., such that the monitor survey is performed in much the same way (e.g., position of sources and receivers relative to the geography) as the baseline survey was performed.

Among other techniques used in 4D seismic data processing, is a technique known as 4D binning. 4D binning is a selection process in which the best matching subsets of traces within the full datasets acquired are identified. As will be appreciated by those skilled in the seismic arts, each "trace" refers to the seismic data recorded for one channel, i.e., between a source and a receiver. Currently performed as an early step in 4D seismic data processing, only the best matching subsets identified during the 4D binning process are considered for further seismic 4D comparison processes.

Conventional four-dimensional (4D) binning is performed in common mid-points, i.e., for each offset class and each mid-point bin, and only one, best-fitting coupled trace is kept for further 4D processing sequences. As will be appreciated by those skilled in the seismic arts, an "offset" refers to a distance relative to template of source and receiver lines used to perform the seismic acquisition. Offsets can be defined in various types or classes. For example, near offsets, mid offsets and far offsets are different classes of offsets which represent different (and increasing) distances from a shot point relative to the acquisition template. Additionally, a "mid-point bin" refers to a square or rectangular area which contains all of the midpoints that correspond to the same common midpoint. Fitting associated with selecting the best-fitting pair is calculated from various criteria, e.g., minimal source and receiver positioning misfit and minimal time-window normalized root mean square (NRMS) error between seismic traces. As will be appreciated by those skilled in the art, an NRMS error criterion refers to the RMS value of the difference between two input traces, normalized by the RMS values of the two input traces.

When performing 4D seismic data processing, it is desirable to select geological horizons in the vicinity of expected 4D changes, i.e., differences between the monitor survey and the baseline survey which are expected due to, e.g., the extraction of hydrocarbons. Selected target horizons, such as a reservoir horizon, are generally buried under laterally heterogeneous overburden and may carry proper dips. As will be appreciated by those skilled in the art, "dips" in this context refer to subsurface reflecting layers which have interfaces which are not perfectly horizontal. Then, with such media features, the midpoint is no longer the reflection point. Consequently, conventional 4D binning could select a couple of traces containing useless diffraction on target traces and discard the specular traces (obeying Snell-Descartes law of reflection) that carry the most important reflective information.

Accordingly, it would be desirable to provide systems and methods that avoid the afore-described problems and drawbacks associated with the improvement of seismic images based on preserving specular reflections on a depth target from 4D binning process.

SUMMARY

These, and other, aspects of the embodiments described below provide for, among other things, target-oriented, 4D binning techniques and systems which enable selection of well matched base survey and monitor survey data subsets from the full datasets generated by the base and monitor acquisitions.

According to an embodiment, a method, stored in a memory and executing on a processor, for preserving seismic reflections associated with a surface of a depth target, said method comprising: selecting said horizon of said depth target where 4D changes are expected; establishing a correspondence between each of a plurality of source and receiver pairs and one of a plurality of reflection bins on said surface; generating one or more sorted subsets of seismic traces from a plurality of seismic traces based on said plurality of reflection bins and a plurality of dataset classes; selecting one or more seismic traces from said subset of seismic traces; outputting said one or more seismic traces.

According to another embodiment, a system for preserving seismic reflections associated with a surface of a depth target, said system comprising: seismic data; one or more processors configured to execute computer instructions and a memory configured to store said computer instructions wherein said computer instructions further comprise: a surface component for selecting a surface where 4D changes are expected; a mapping component for computing a correspondence between a source/receiver pair and a reflection bin; a sorting component for generating a subset of seismic traces associated with a reflection bin and a dataset class; a selection component for selecting an optimal seismic trace from said subset of seismic traces; and an output component for outputting said optimal seismic trace.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of preserving specular reflections on a depth target and enhancing a 4D target signature. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to various embodiments described herein, methods and systems for preserving specular reflections on a depth target are presented which, for example, match base and monitor datasets in common reflection point gathers. Such methods and systems can, for example, be used to enhance a 4D target signature.

Figure 1:
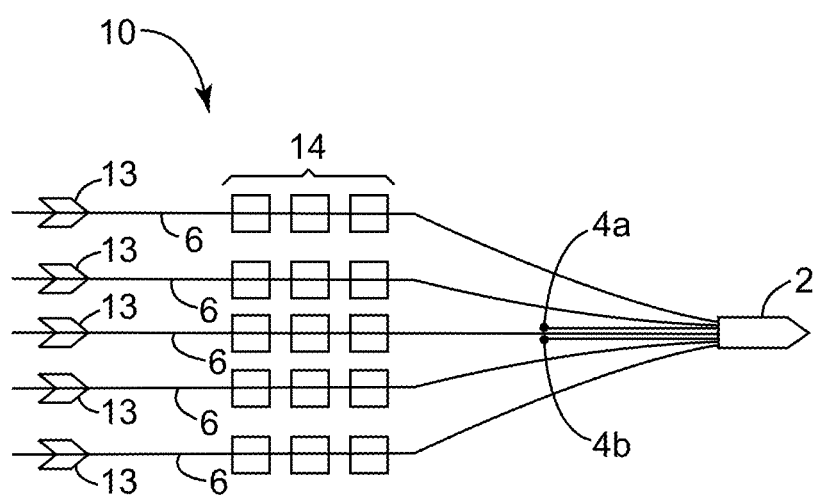
FIGS. 1-2 depict various aspects of an exemplary marine seismic survey system.

In order to provide some context for the subsequent embodiments for preserving specular reflections on a target and enhancing a 4D target signature, consider first a seismic data acquisition process and system as will now be described with respect to FIG. 1. In FIG. 1, a data acquisition system 10 includes a ship 2 towing a plurality of streamers 6 that can extend one or more kilometers behind the ship 2. Each of the streamers 6 can include one or more birds 13 that maintain the streamer 6 in a known fixed position relative to other streamers 6, and the one or more birds 13 are capable of moving the streamers 6 as desired according to bi-directional communications received by the birds 13 from the ship 2.

One or more source arrays 4a,b can also be towed by ship 2, or another ship, for generating seismic waves. Source arrays 4a,b can be placed either in front of or behind the receivers 14, or both behind and in front of the receivers 14. The seismic waves generated by the source arrays 4a,b propagate downward, reflect off of, and penetrate the seafloor, wherein the refracted waves eventually are reflected by one or more reflecting structures (not shown in FIG. 1(a)) back to the surface (see FIG. 2, discussed below). The reflected seismic waves then propagate upward and are detected by the receivers 14 disposed on the streamers 6. The seismic waves then reflect off of the free surface, i.e., the surface of the body of water (see FIG. 2, discussed below), traveling downward and are once again detected by the receivers 14 disposed on streamers 6 as receiver ghosts. This process is generally referred to as "shooting" a particular seafloor area, with the seafloor area referred to as a "cell" and the sea surface referred to as a "free surface."

Figure 2:
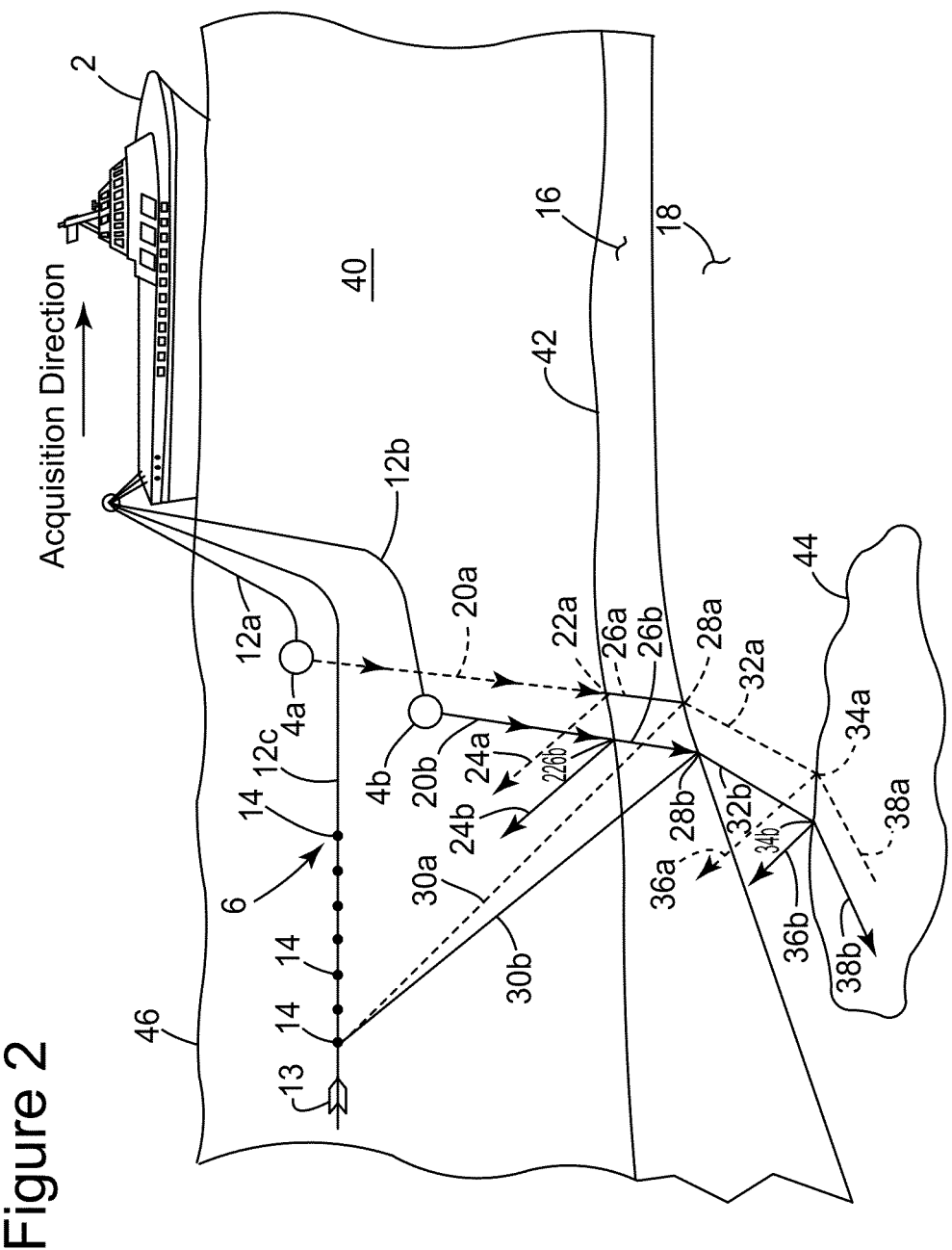

FIG. 2 illustrates a side view of the data acquisition system 10 of FIG. 1. Ship 2, located on sea surface 46, tows one or more streamers 6, wherein the streamer 6 are comprised of cable 12c and a plurality of receivers 14. Shown in FIG. 2 are two sources which include sources 4a,b attached to respective cables 12a,b. Each source 4a,b is capable of transmitting a respective sound wave, or transmitted signal 20a,b. For the sake of simplifying the drawings, but while not detracting at all from an understanding of the many principles involved, only a first pair of transmitted signals 20a,b will be shown (even though some or all of sources 4 can be simultaneously (or not) transmitting similar transmitted signals 20). First transmitted signal 20a,b travels through the sea 40 and arrives at first refraction/reflection point 22a,b. First reflected signal 24a,b from first transmitted signal 20a,b travels upward from the seafloor 42, and back to the receivers 14. As those of skill in the art can appreciate, whenever a signal—optical or acoustical—travels from one medium with a first index of refraction $n_1$ and meets with a different medium, with a second index of refraction $n_2$, a portion of the transmitted signal is reflected at an angle equal to the incident angle (according to the well-known Snell's law), and a second portion of the transmitted signal can be refracted (again according to Snell's law).

Accordingly, as shown in FIG. 2, first transmitted signal 20a,b generates first reflected signal 24a,b and first refracted signal 26a,b. First refracted signal 26a,b travels through sediment layer 16 (which can be generically referred to as first subsurface layer 16) beneath ocean floor 42, and can now be considered to be a "new" transmitted signal, such that when it encounters a second medium at second refraction/reflection point 28a,b, a second set of refracted and reflected signals 32a,b and 30a,b are subsequently generated. Further, as shown in FIG. 2, there happens to be a significant hydrocarbon deposit 44 within a third medium, or solid earth/rock layer 18 (which can be generically referred to as second subsurface layer 18). Accordingly, refracted 38a,b and reflected 36a,b signals are generated by the hydrocarbon deposit at the refraction/reflection point 34a,b and it is the purpose of data acquisition system 10 to generate data that can be used to discover such hydrocarbon deposits 44.

It will be appreciated by those skilled in the art that the marine seismic acquisition system illustrated in FIGS. 1 and 2 is purely illustrative and that the following embodiments can be applied to seismic data acquired using different types of marine seismic acquisition systems. Indeed the following embodiments are also not limited to application to seismic data acquired by marine seismic acquisition systems, but can also be applied to other seismic data acquisitions including, but not limited to, land seismic acquisitions, ocean bottom nodes and cables, well seismics and mixed acquisitions (e.g., streamers with nodes data or surface with well data, etc.)

The signals recorded by seismic receivers 14 vary in time, having energy peaks that may correspond to reflectors between layers. In reality, since the sea floor and the air/water are highly reflective, some of the peaks correspond to multiple reflections or spurious reflections that should be eliminated before the geophysical structure can be correctly imaged. Primary waves suffer only one reflection from an interface between layers of the subsurface (e.g., first reflected signal 24a). Waves other than primary waves are known as multiples. A surface multiple signal (not shown) is one such example of a multiple, however there are other ways for multiples to be generated. For example, reflections form the surface can travel back down to the receivers and be recorded as ghosts. Multiples do not add any useful information about the geology beneath the ocean floor, and thus they are, in essence, noise, and it is desirable to eliminate them and/or substantially reduce and/or eliminate their influence in signal processing of the other reflected signals so as to correctly ascertain the presence (or the absence) of underground/underwater hydrocarbon deposits. Similarly ghosts, i.e., reflections of primary waves or multiples from the surface of the water which are again recorded by receivers 14, should also be suppressed or removed. For the following embodiments, it should be noted that, based on the user's choice during the data processing, the reflection points can correspond to primary waves or multiples raypath, or any raypath of any signature, as long it does correspond to reflected seismic energy.

Also useful for the processing of seismic data in the context of the following embodiments is a tool or data processing component, e.g., running on one or several processors in a computer system, which establishes a correspondence between source-receiver pairs in the acquisition system and reflection points. This data processing component operates to establish this correspondence based on wave propagation in the subsurface (e.g., ray tracing or detection from travel time maps along the horizon) and uses knowledge of a subsurface velocity model (or any approximation of it). As will be appreciated by those skilled in the art, velocity models describe the expected speed of acoustic waves passing through the various layers of the subsurface region of interest, and are used for a number of purposes in processing acquired seismic data.

The data collected and recorded by receivers 14 of FIG. 1 can be processed by an embodiment to, among other things, preserve specular reflections on a depth target. The embodiment can perform target-oriented 4D binning in common reflection point wherein a depth target surface is defined at or in the vicinity of a location where 4D changes are expected, e.g., a reservoir horizon as depicted in FIG. 3.

Figure 3:
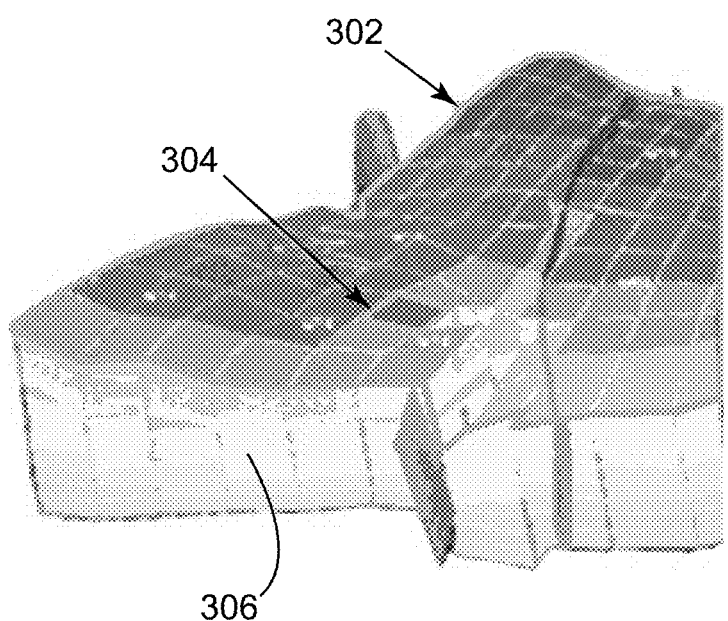
FIG. 3 depicts a gridded target horizon.
Figure 4:
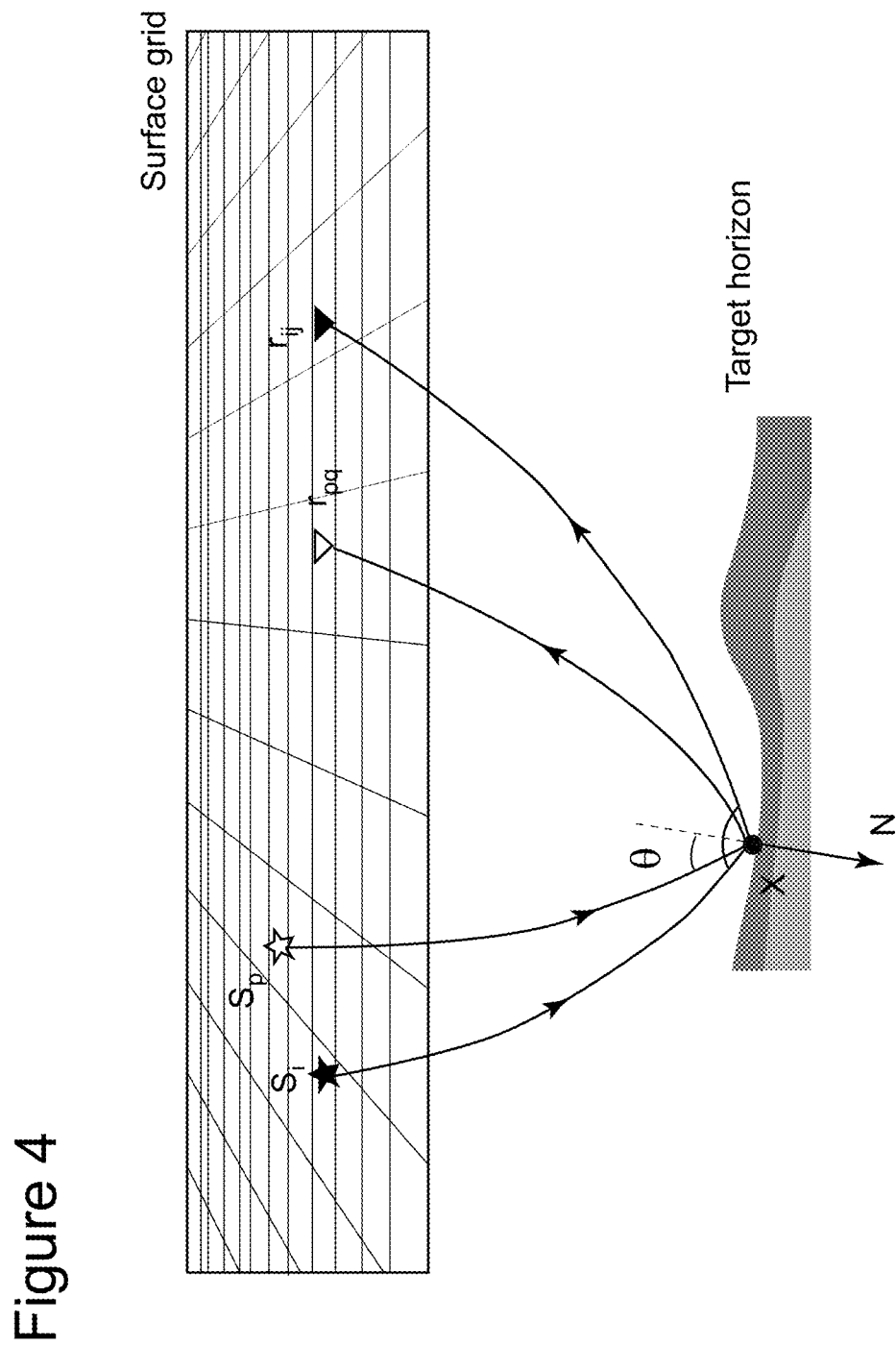
FIG. 4 depicts a subset in common-reflection-point, common-reflection angle class.
Figure 5:
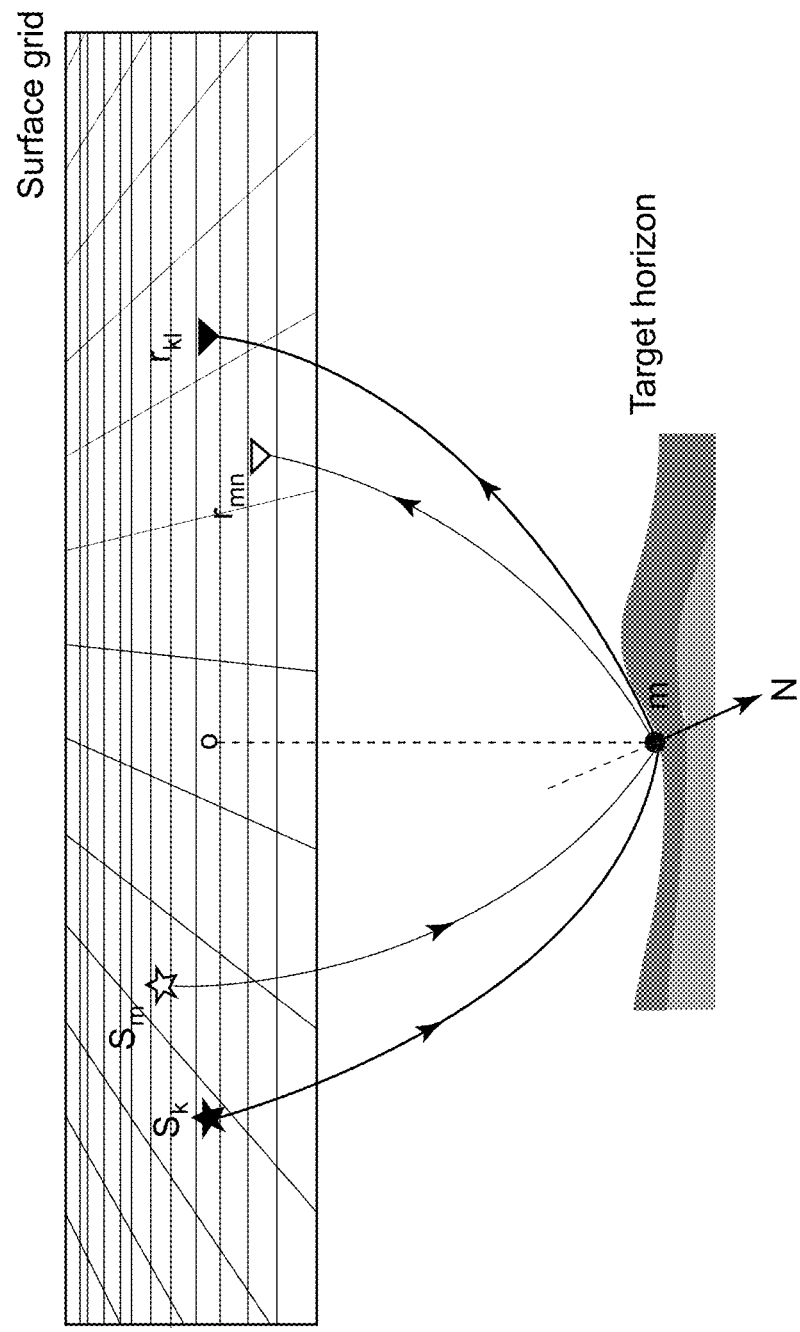
FIG. 5 depicts a subset in common-midpoint, common-offset class.

As can be observed from FIG. 3, an embodiment presents a target horizon 302 on top of reservoir 306, gridded (meshed) into grid cells 304. In the following, a grid cell will also be denoted as a bin. Further, to provide a context for the one or more embodiment descriptions and an understanding of how target-oriented 4D binning in common reflection point (CRP) is accomplished, it should be understood for the survey that a wave propagation method (e.g. ray calculation or derivation from travel time maps) is used to establish a correspondence between each source-receiver pair (s, r), examples of which are shown in FIGS. 4 and 5, and one reflection bin cell (x) 304 on the target horizon (H) 302. As will be appreciated by those skilled in the art, a "reflection point" refers to the point on a subsurface interface where an acoustic wave generated by a source is reflected back toward a receiver. A "common reflection point" occurs when the reflection point for a one source-receiver pair is the same as that of one or more other source-receiver pairs. This correspondence between source-receiver pairs and reflection bin cells can be achieved, in an embodiment for example, with ray shooting in the known velocity model. It should be noted in the embodiment that FIG. 4 depicts a subset in the common-reflection-point, common-reflection-angle class (defined by aperture and azimuth reflection angles, both of which are generically referenced by Θ in FIG. 4) while FIG. 5 depicts a subset in a common-midpoint, common-offset class.

In this context, it will be appreciated by those skilled in the art that the term "reflection angle" in 3D (or 4D) seismic surveying actually is defined by two angles, i.e., an aperture angle and an azimuth angle. In practice, the common reflection angle class is thus defined by a range of aperture angles and azimuth angles. Thus in the following, it will be appreciated that below where various processes are described as being performed on, e.g., angle gathers, equivalent processes can be performed for azimuth gathers.

Continuing with the embodiment, for each reflection bin cell 304 and each class C, wherein C is a common-offset class or, preferably a common-reflection-angle class, a subset of specular traces S(x, C) is sorted. It should be noted in the embodiment that all traces from S(x, C) carry reflective information from the target and should be preserved. Further in the embodiment, for each reflection bin cell 304, x∈ $\mathcal{H}$ and each class C, two subsets of specular traces $S_{base}$(x, C) and $S_{monitor}$(x, C) are collected from base and monitor surveys.

Considering an embodiment of 4D binning in CRP, 4D binning focuses on retaining the most comparable traces from base and monitor surveys, for each bin and each class. i.e., $T_{base}$(x, C) and $T_{monitor}$(x, C). It should be noted in the embodiment that the selected set of traces will form the final base and monitor datasets, i.e., $\mathcal{D}_{base}$ and $\mathcal{D}_{monitor}$, for further processing in 4D sequences as follows:

$$\mathcal{D}_{base} = \cup_{x,C} T_{base}(x, C),$$

$$\mathcal{D}_{monitor} = \cup_{x,C} T_{monitor}(x, C),$$

Continuing with the embodiment, target-oriented 4D binning in common-reflection point focuses on selecting and preserving the specular information from the depth target and this goal is achieved by selecting the most comparable traces within specular subsets of traces. For each reflection bin cell, x∈$\mathcal{H}$, and each class, C, of the embodiment, selected traces $T_{base}$(x, C) and $T_{monitor}$(x, C) are defined in many possible ways, some of which are presented here. First embodiment, by selecting the best fitting couple of traces such based on the following equation:

$$\mathcal{F}(T_{base}(x,C), T_{monitor}(x,C)) = \min_{i,j,k,l} \mathcal{F}(t_{base}(s_i, r_{ij}), t_{monitor}(s_k, r_{kl})) \quad (1)$$

wherein for all traces of subsets, $t_{base}(s_i, r_{ij}) \in S_{base}$(x, C) and $t_{monitor}(s_k, r_{kl}) \in S_{monitor}$(x, C). It should be noted in the embodiment that any relevant criteria and minimization fitting function ($\mathcal{F}$) can be selected. Second embodiment, generate a stack from several or all traces within each subset, either with or without prior moveout correction based on the equations that follow:

$$T_{base}(x,C)=\Sigma_{ij}t_{base}(s_i,r_{ij}) \text{ for all traces of the subset}$$
$$t_{base}(s_i,r_{ij})\in S_{base}(x,C) \quad (2)$$

and $$T_{monitor}(x,C)=\Sigma_{kl}t_{monitor}(s_k,r_{kl}) \text{ for all traces of the subset } t_{monitor}(s_k,r_{kl})\in S_{monitor}(x,C) \quad (3)$$

It should be noted in the embodiment that dedicated 4D binning in common-reflection points can alternatively be carried out for different types of reflections, e.g., PP, PS, etc.

Based on the fact that specular information along the depth target is better preserved, the embodiments described herein are expected to improve the signal-to-noise ratio for higher reliability and enhancement of 4D changes along the target. It should be noted in the embodiment that these 4D changes along the target are otherwise known as a 4D target signature. Further benefits of the embodiments include, but are not limited to making 4D changes from trace-to-trace comparisons straightforward to map onto a target. Specular subsets can be used to reveal localized lack of illumination folds on the target, i.e., lack of or too few specular traces, which information is valuable for in-field design.

Figure 6:
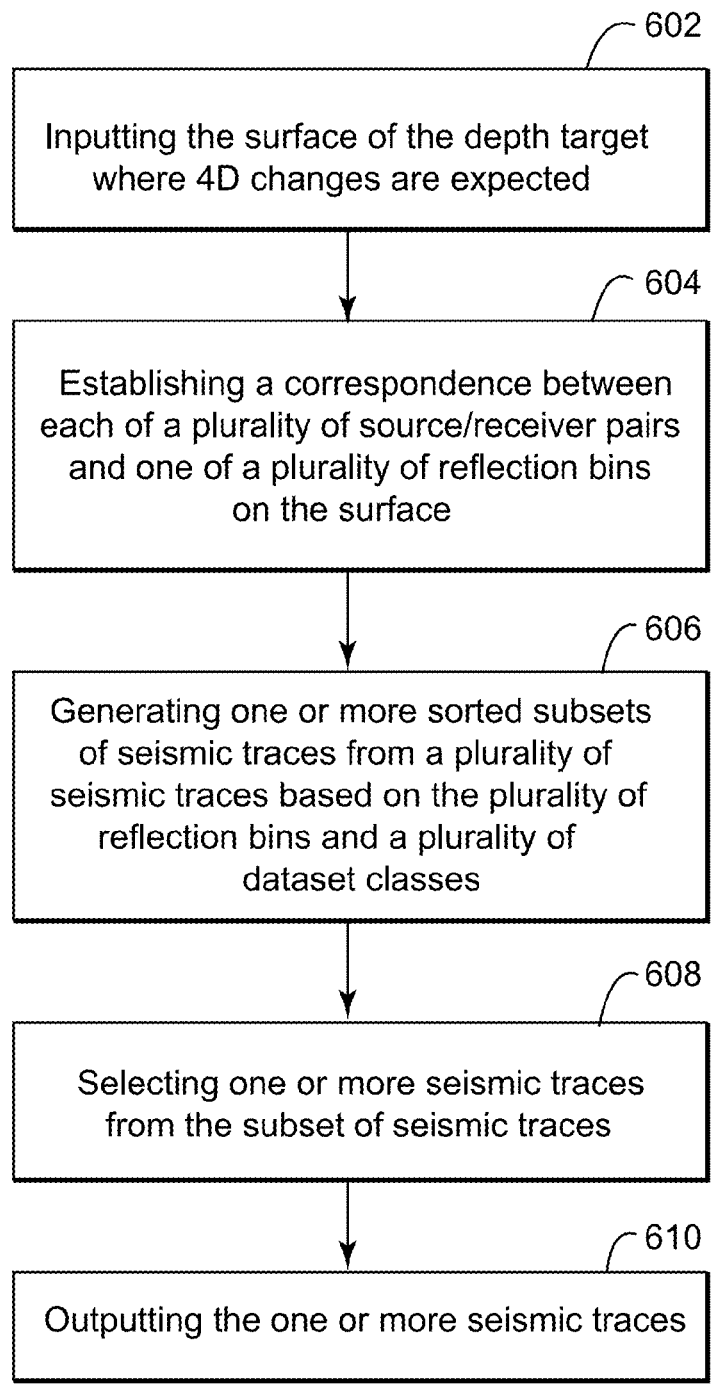
FIG. 6 depicts a flowchart of a method embodiment.

Looking now to FIG. 6, a method embodiment for preserving seismic reflections associated with a depth target is depicted. Beginning at step 602 of the method embodiment, the method embodiment selects, loads or inputs the surface of the depth target where 4D changes are expected. It should be noted in the method embodiment that the predicted depth target can be a reservoir horizon.

Next, at step 604, the method embodiment establishes a correspondence between each of a plurality of source/receiver pairs and one of a plurality of reflection bins on the input surface. It should be noted in the method embodiment that the correspondence can be established with available techniques such as, but not limited to, ray shooting in the known velocity model.

Next at step 606, the method embodiment generates one or more sorted subsets of seismic traces, based on a plurality of reflection bins and a plurality of dataset classes. It should be noted in the method embodiment that the sorted traces carry reflective information from the depth target. It should further be noted in the method embodiment that the sorted traces are collected from both base surveys and monitor surveys.

Continuing, at step 608, with the method embodiment, one or more seismic traces are selected from the subset of seismic traces. It should be noted in the method embodiment that for each reflection bin and each angle class (i.e. for given aperture and azimuth angles), a pairing can be generated based on a best fitting or best matching couple of traces or based on a stack of all traces within each subset, either with or without moveout correction. Next, at step 610 of the method embodiment, the selected seismic traces are output for further processing. It should be noted in the method embodiment that seismic traces comprise specular traces, PP traces, PS traces, etc.

Figure 7:
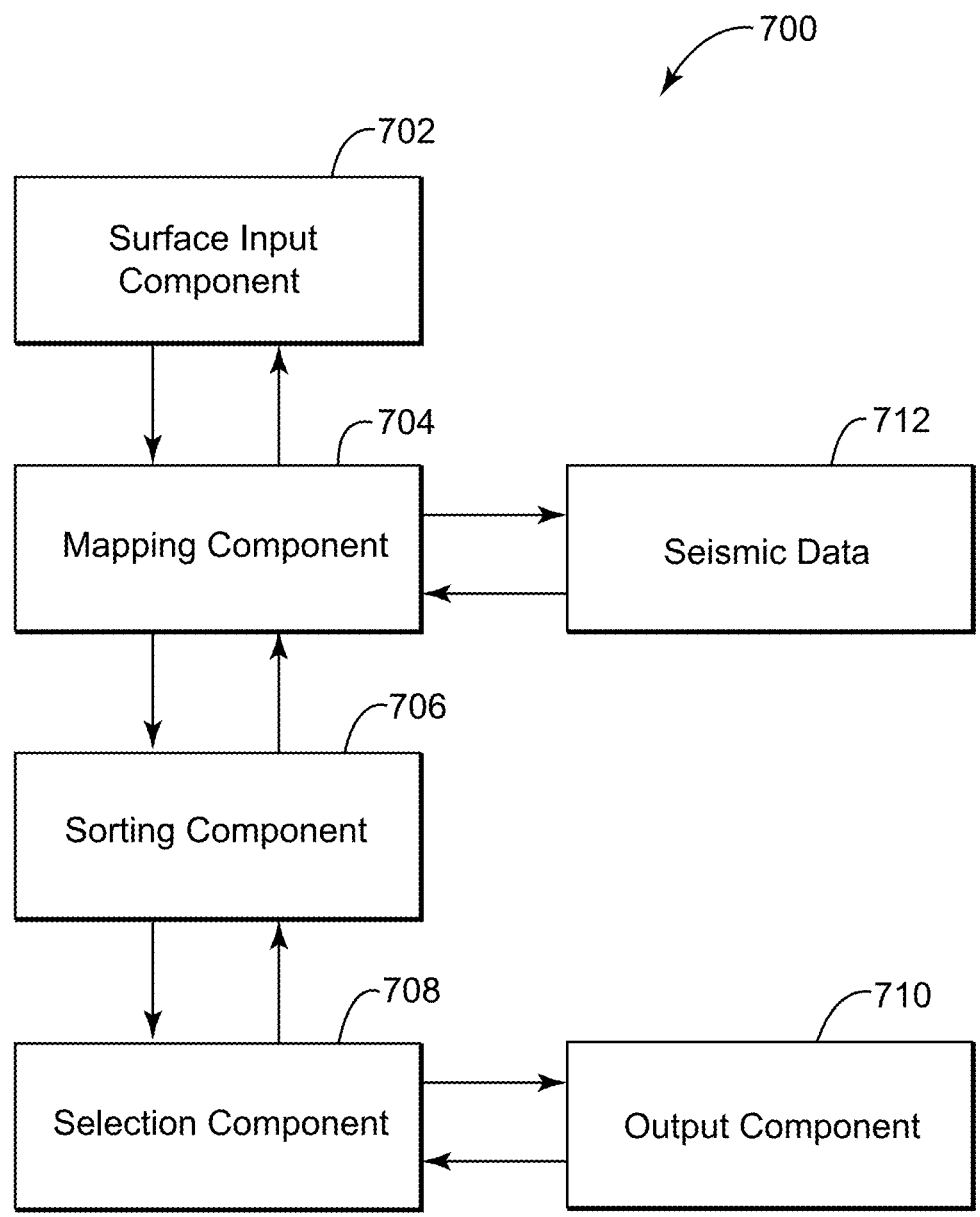
FIGS. 7-10 depict various aspects of software components or modules which can be used to implement the embodiments.

As will be appreciated from the foregoing discussion, methods for target oriented 4D binning according to these embodiments may, at least in part, be implemented in software operating on a suitably programmed computing device. An exemplary implementation, with suitable software modules or components, will now be described with respect to FIG. 7. Looking now to FIG. 7, an embodiment target oriented 4D binning node 700 comprises a surface component 702, a mapping component 704, a sorting component 706, a selection component 708, an output component 710 and seismic data 712. The surface prediction component 702 provides the capability to define a depth surface where 4D changes are expected. It should be noted in the exemplary embodiment that the surface can be a reservoir horizon or else.

Continuing with the embodiment, the mapping component 704 provides the capability to establish a correspondence between source/receiver seismic trace pairs of the seismic data 712 and reflection bins associated with the predicted depth surface. It should be noted in the embodiment that different techniques, well known in the art, are available for establishing the correspondence. Continuing with the embodiment, the sorting component 706 provides the capability to sort seismic traces into subsets based on an associated reflection bin and a reflection class. It should be noted in the embodiment that the traces carry reflective information associated with the depth target.

Next in the embodiment, the selection component 708 provides the capability to select the most comparable traces that retain the best information from the seismic images associated with the depth target. It should be noted that the selections are made from the subsets associated with the reflection bins. Continuing with the embodiment, the output component 710 provides the capability to output the selected seismic traces for further processing.

Figure 8:
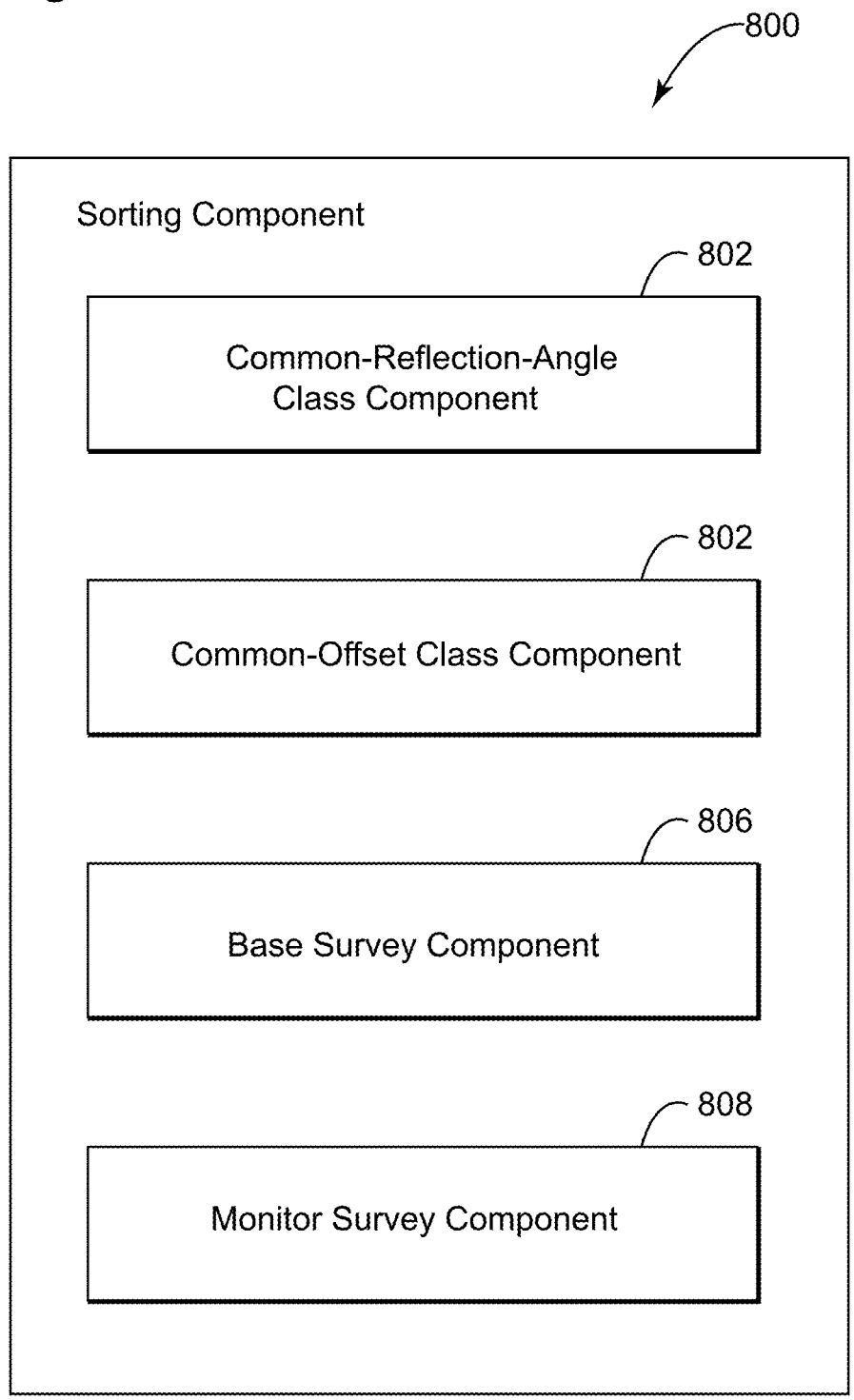

Looking to FIG. 8, an embodiment sorting component 706 comprises a common-reflection-angle class component 802, a common-offset class component 804, a base survey component 806 and a monitor survey component 808. The common-reflection-angle component 802 of the embodiment provides the capability to sort a common-reflection-angle class of seismic traces while the common-offset 804 component provides the capability to sort a common-offset class of seismic traces.

Continuing with the embodiment, the base survey component 806 provides for processing the seismic traces associated with the base survey and the monitor survey component 808 provides for processing the seismic traces associated with the monitor survey.

Figure 9:
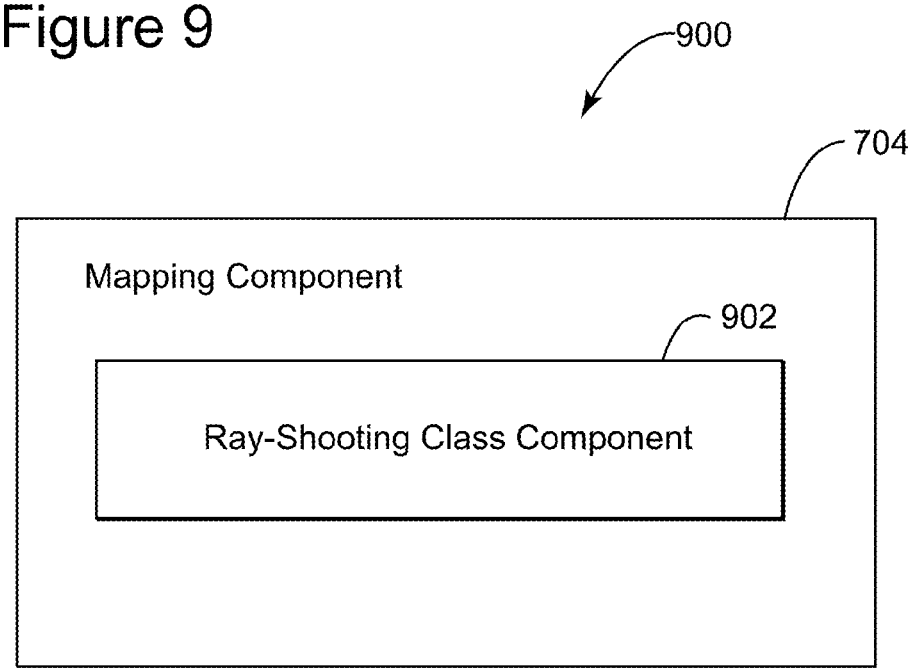
Figure 10:
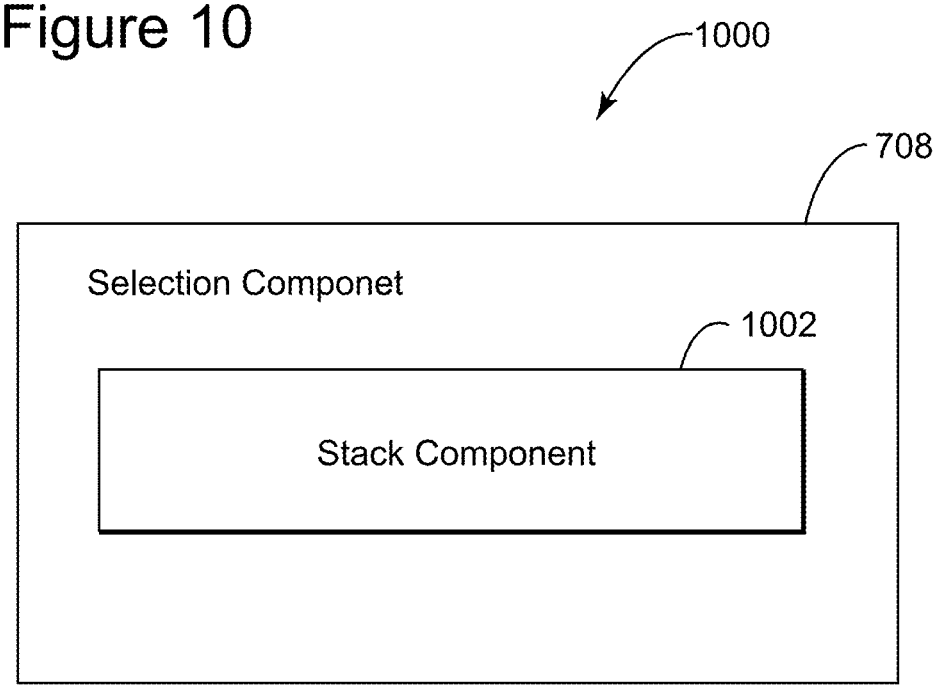
Figure 11:
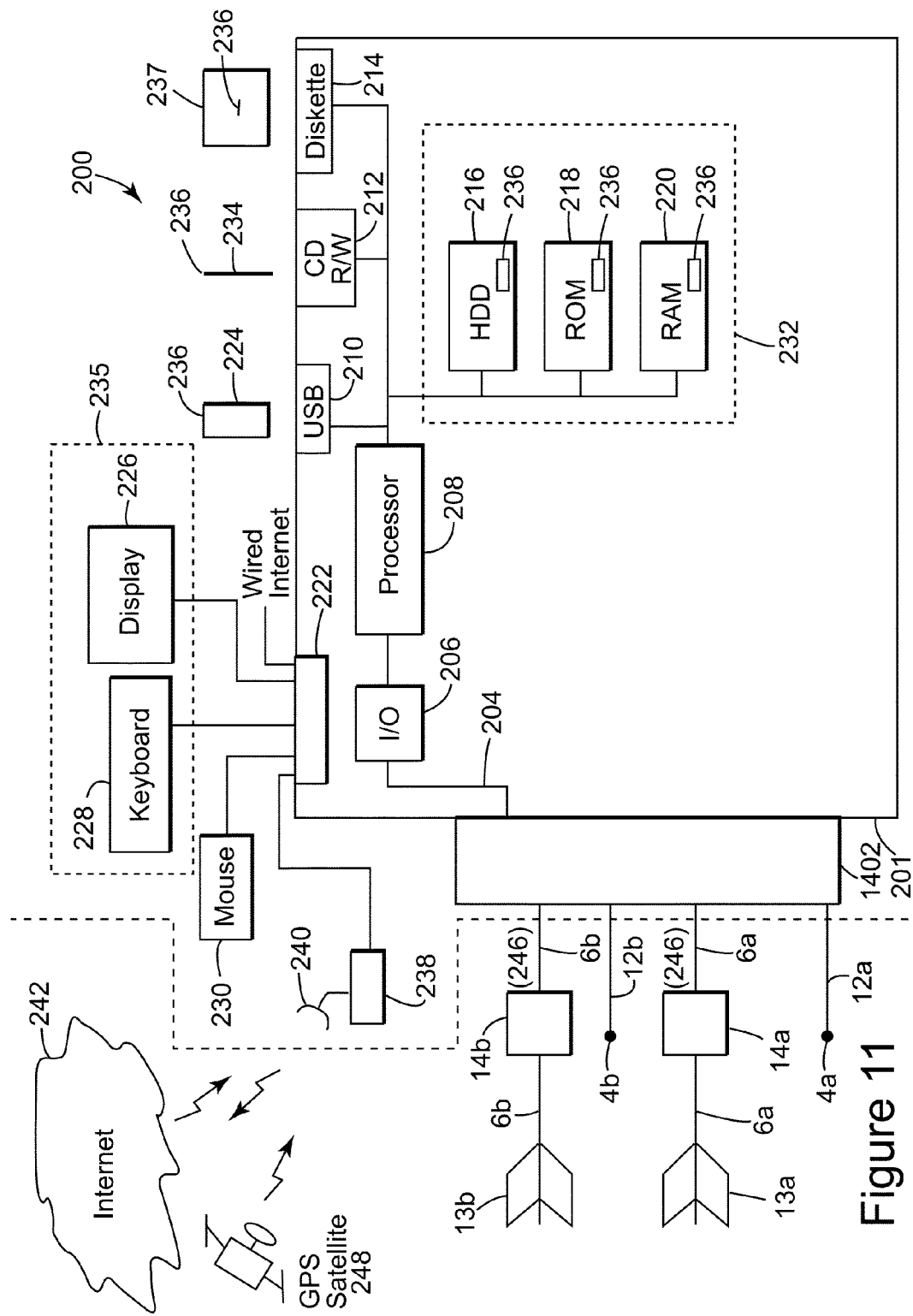
FIG. 11 depicts an exemplary data processing device or system which can be used to implement the embodiments.

Looking now to FIG. 9 of an embodiment, a mapping component 704 further comprises a ray-shooting component 902. The embodiment ray-shooting component 902 provides the capability to establish a correspondence between each source/receiver trace pair and an associated reflection bin on a depth target. Continuing with FIG. 10 of an embodiment, a selection component 708 further comprises a stack component 1002. The embodiment stack component 1002 provides the capability to stack several or all of the seismic traces associated with a subset. It should be noted in the embodiment that the stacking can occur either with or without a moveout correction. As mentioned previously, selection can be performed by, for example, for each reflection bin and each angle class (i.e. for given aperture and azimuth angles), generating a pairing of traces (one monitor trace and one baseline trace) based on a best fitting calculation or based on a stack of all traces within each subset, either with or without moveout correction The computing device(s) or other network nodes involved in target oriented 4D binning as set forth in the above described embodiments may be any type of computing device capable of processing and communicating seismic data associated with a seismic survey. An example of a representative computing system capable of carrying out operations in accordance with these embodiments is illustrated in FIG. 11. System 1100 includes, among other items, server 201, source/receiver interface 1402, internal data/communications bus (bus) 204, processor(s) 208 (those of ordinary skill in the art can appreciate that in modern server systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application), universal serial bus (USB) port 210, compact disk (CD)/digital video disk (DVD) read/write (R/W) drive 212, floppy diskette drive 214 (though less used currently, many servers still include this device), and data storage unit 232.

Data storage unit 232 itself can comprise hard disk drive (HDD) 216 (these can include conventional magnetic storage media, but, as is becoming increasingly more prevalent, can include flash drive-type mass storage devices 224, among other types), ROM device(s) 218 (these can include electrically erasable (EE) programmable ROM (EEPROM) devices, ultra-violet erasable PROM devices (UVPROMs), among other types), and random access memory (RAM) devices 220. Usable with USB port 210 is flash drive device 224, and usable with CD/DVD R/W device 212 are CD/DVD disks 234 (which can be both read and write-able). Usable with diskette drive device 214 are floppy diskettes 237. Each of the memory storage devices, or the memory storage media (216, 218, 220, 224, 234, and 237, among other types), can contain parts or components, or in its entirety, executable software programming code (software) 236 that can implement part or all of the portions of the method described herein. Further, processor 208 itself can contain one or different types of memory storage devices (most probably, but not in a limiting manner, RAM memory storage media 220) that can store all or some of the components of software 236.

In addition to the above described components, system 200 also comprises user console 234, which can include keyboard 228, display 226, and mouse 230. All of these components are known to those of ordinary skill in the art, and this description includes all known and future variants of these types of devices. Display 226 can be any type of known display or presentation screen, such as liquid crystal displays (LCDs), light emitting diode displays (LEDs), plasma displays, cathode ray tubes (CRTs), among others. User console 235 can include one or more user interface mechanisms such as a mouse, keyboard, microphone, touch pad, touch screen, voice-recognition system, among other inter-active inter-communicative devices.

User console 234, and its components if separately provided, interface with server 201 via server input/output (I/O) interface 222, which can be an RS232, Ethernet, USB or other type of communications port, or can include all or some of these, and further includes any other type of communications means, presently known or further developed. System 200 can further include communications satellite/global positioning system (GPS) transceiver device 238, to which is electrically connected at least one antenna 240 (according to an exemplary embodiment, there would be at least one GPS receive-only antenna, and at least one separate satellite bi-directional communications antenna). System 200 can access internet 242, either through a hard wired connection, via I/O interface 222 directly, or wirelessly via antenna 240, and transceiver 238.

Server 201 can be coupled to other computing devices, such as those that operate or control the equipment of ship 2, via one or more networks. Server 201 may be part of a larger network configuration as in a global area network (GAN) (e.g., internet 242), which ultimately allows connection to various landlines.

According to a further exemplary embodiment, system 200, being designed for use in seismic exploration, will interface with one or more sources 4a,b and one or more receivers 14. These, as previously described, are attached to streamers 6a,b, to which are also attached birds 13a,b that are useful to maintain positioning. As further previously discussed, sources 4 and receivers 14 can communicate with server 201 either through an electrical cable that is part of streamer 6, or via a wireless system that can communicate via antenna 240 and transceiver 238 (collectively described as communications conduit 246).

According to further exemplary embodiments, user console 235 provides a means for personnel to enter commands and configuration into system 200 (e.g., via a keyboard, buttons, switches, touch screen and/or joy stick). Display device 226 can be used to show: streamer 6 position; visual representations of acquired data; source 4 and receiver 14 status information; survey information; and other information important to the seismic data acquisition process. Source and receiver interface unit 202 can receive the hydrophone seismic data from receiver 14 though streamer communication conduit 248 (discussed above) that can be part of streamer 6, as well as streamer 6 position information from birds 13; the link is bi-directional so that commands can also be sent to birds 13 to maintain proper streamer positioning. Source and receiver interface unit 202 can also communicate bi-directionally with sources 4 through the streamer communication conduit 248 that can be part of streamer 6. Excitation signals, control signals, output signals and status information related to source 4 can be exchanged by streamer communication conduit 248 between system 200 and source 4.

Bus 204 allows a data pathway for items such as: the transfer and storage of data that originate from either the source sensors or streamer receivers; for processor 208 to access stored data contained in data storage unit memory 232; for processor 208 to send information for visual display to display 226; or for the user to send commands to system operating programs/software 236 that might reside in either the processor 208 or the source and receiver interface unit 202.

System 200 can be used to implement the methods described above associated with target oriented 4D binning according to an embodiment. Hardware, firmware, software or a combination thereof may be used to perform the various steps and operations described herein. According to an embodiment, software 236 for carrying out the above discussed steps can be stored and distributed on multi-media storage devices such as devices 216, 218, 220, 224, 234, and/or 237 (described above) or other form of media capable of portably storing information (e.g., universal serial bus (USB) flash drive 426). These storage media may be inserted into, and read by, devices such as the CD-ROM drive 414, the disk drive 412, among other types of software storage devices.

It should be noted in the embodiments described herein that these techniques can be applied in either an "offline", e.g., at a land-based data processing center or an "online" manner, i.e., in near real time while onboard the seismic vessel. For example, target oriented 4D binning can be processed and updated as the seismic data is recorded onboard the seismic vessel, once a new set of navigation lines has been acquired and at completion of the survey. In this case, it is possible for target oriented 4D binning to be computed as a measure of the quality of the sampling run.

The disclosed exemplary embodiments provide a server node, and a method for target oriented 4D binning associated with seismic data. It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the invention. However, one skilled in the art would understand that various embodiments may be practiced without such specific details.

The embodiments described herein are primarily described in the context of towed streamer (marine) acquisition. However those skilled in the art will appreciate how to extend the described embodiments to other contexts, including, but not limited to land acquisition, Vertical Seismic Profiling, cross-well seismic, or ocean bottom 4-components sensors, such as Ocean Bottom Nodes or Ocean Bottom Cables or any mixed-type acquisition, which other embodiments are also considered to be included herein. In the latter case, the embodiments can be applied offline, as it is not easy to retrieve data from nodes during acquisition. However online QC may be performed in the case of Permanent Reservoir Monitoring Systems.

Although the features and elements of the present embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for preserving seismic reflections associated with a surface of a target in data acquired by seismic surveying, said method comprising:
    acquiring data using receivers placed above an underground formation at two different times, said data representing detected reflections of seismic excitations emitted by one or more sources to propagate inside the underground formation;
    inputting information about said surface inside the underground formation, where 4D changes are expected;
    establishing a correspondence between each of a plurality of source and receiver pairs and one of a plurality of reflection bins on said input surface;
    generating one or more sorted subsets of seismic traces from a plurality of seismic traces based on said plurality of reflection bins and a plurality of dataset classes;
    selecting one or more seismic traces from said sorted subset of seismic traces; and
    outputting said one or more seismic traces to be used to determine said 4D changes.

2. The method of claim 1, wherein said surface of said depth target is a reservoir horizon.

3. The method of claim 1, wherein said correspondence is established with a ray shooting in a velocity model or any equivalent method.

4. The method of claim 1, wherein one of said plurality of dataset classes is a vectorial common-offset class.

5. The method of claim 1, wherein one of said plurality of dataset classes is a common-reflection-angle class defined by aperture and azimuth angles.

6. The method of claim 1, wherein said one or more subsets of traces comprise subsets of traces from a base survey and subsets of traces from a monitor survey.

7. The method of claim 1, wherein said step of selecting is based on selecting most comparable r traces within each of said one or more sorted subsets of specular traces.

8. The method of claim 7, wherein a matching function is used to determine said most comparable specular traces.

9. The method of claim 7, wherein a stack of several or all traces associated with a subset are used to determine said most comparable specular traces.

10. The method of claim 1, wherein said seismic reflections are primary wave (PP) reflections and said seismic traces are primary wave (PP) traces.

11. The method of claim 1, wherein said seismic reflections are converted wave (PS) reflections and said seismic traces are converted wave (PS) traces.

12. The method of claim 1, wherein the seismic traces are acquired using one of: a marine seismic acquisition system, a land seismic acquisition system, a Vertical Seismic Profiling, a cross-well seismic acquisition system, ocean bottom 4-components sensors, such as Ocean Bottom Nodes or Ocean Bottom Cables or a mixed-type seismic acquisition system.

13. A system for preserving seismic reflections associated with a surface of a target in seismic data acquired by seismic surveying, said system comprising:
    at least one memory device configured to store seismic data acquired using receivers placed above an underground formation, at two different times, said data representing detected reflections of seismic excitations emitted by one or more sources to propagate inside the underground formation;
    one or more processors configured to execute computer instructions and a memory configured to store said computer instructions wherein said computer instructions further comprise:
        a surface input component for inputting information about said surface at a target depth inside the underground formation where 4D changes are expected;
        a mapping component for computing a correspondence between a source/receiver pair and a reflection bin;
        a sorting component for generating a subset of seismic traces associated with a common reflection bin and a common dataset class;
        a selection component for selecting an optimal seismic trace from said subset of seismic traces; and
        an output component for outputting said optimal seismic trace to be used to determine said 4D changes.

14. The system of claim 13, wherein said sorting component further comprises a common-reflection-angle class component.

15. The system of claim 13, wherein said depth target is a horizon at, above or below a reservoir.

16. The system of claim 13, wherein said mapping component further comprises a ray shooting component.

17. The system of claim 13, wherein said sorting component further comprises a vectorial common-offset class component.

18. The system of claim 13, wherein said sorting component further comprises a base survey component and monitor survey component.

19. The system of claim 13, wherein selection component further comprises a stack component.

20. The system of claim 13, wherein the seismic traces are acquired using one of: a marine seismic acquisition system, a land seismic acquisition system, Vertical Seismic Profiling, a cross-well seismic acquisition system, ocean bottom 4-components sensors, such as Ocean Bottom Nodes or Ocean Bottom Cables or a mixed-type seismic acquisition system.

* * * * *